United States Patent [19]
Yoshioka

[11] Patent Number: 5,971,143
[45] Date of Patent: Oct. 26, 1999

[54] CD CONTAINING CASE

[75] Inventor: Kazumasa Yoshioka, Kawasaki, Japan

[73] Assignee: Chapter One Co., Ltd., Kanagawa-ken, Japan

[21] Appl. No.: 09/063,860

[22] Filed: Apr. 21, 1998

[30] Foreign Application Priority Data

Jan. 7, 1998 [JP] Japan ................................ 10-000144
Mar. 6, 1998 [JP] Japan ................................ 10-001644

[51] Int. Cl.⁶ .................................................. B65D 85/57
[52] U.S. Cl. ....................................... 206/307; 206/308.1
[58] Field of Search ............................. 206/307, 308.1, 206/309, 311, 312, 232, 459.5

[56] References Cited

U.S. PATENT DOCUMENTS

| | | |
|---|---|---|
| 5,097,375 | 3/1992 | Khan . |
| 5,494,445 | 2/1996 | Sekiguchi et al. . |
| 5,544,741 | 8/1996 | Fantone et al. .................. 206/308.1 |
| 5,850,912 | 12/1998 | Ganser et al. ................... 206/308.1 |
| 5,893,455 | 4/1999 | Biedebach et al. .............. 206/308.1 |

FOREIGN PATENT DOCUMENTS

0784324 7/1997 European Pat. Off. .
29607929 9/1996 Germany .

*Primary Examiner*—Paul T. Sewell
*Assistant Examiner*—Luan K. Bui
*Attorney, Agent, or Firm*—Goodman & Teitelbaum, Esqs.

[57] ABSTRACT

A CD containing case has a function of ornament and/or fragrance as well as a function of a distinction between one's own product and other's product and an ornamental effect by means of a photograph, a picture, characters or the like on a jacket. It is possible to present an ornamental effect and a fragrant effect to the CD containing case by disposing filling members for use of ornament and fragrance in a space for a hinge portion of a main portion of the CD containing case. The filling members may be disposed in an ornamental case arranged in the space for the hinge portion or disposed in a case portion formed in the hinge portion of the main body. The ornamental case or the case portion may be provided with at least a partition for dividing its interior or with a pivotable lid.

8 Claims, 6 Drawing Sheets

CD CONTAINING CASE

BACKGROUND OF THE INVENTION

This invention relates to a case for containing a disc such as a compact disc on which a music is recorded, a CD-ROM or a DVD in which various kinds of datum such as a game, a photograph, a software, or the like, and more particularly relates to the disc containing case having a function of ornament and/or fragrance. The "disc" and "case" are hereinafter referred to a "CD" and a "CD containing case", respectively.

Currently, a CD containing case is standardized. In the case where distinctive effect between one's own product and other's product, an ornamental effect, or the like is applied to each of the CD containing cases, a jacket attached to the case performs that effect. Consequently, a photograph, a picture, characters, or the like is expressed on the jacket in order to distinguish one's own CD from other's CD or to perform an ornamental effect.

SUMMARY OF THE INVENTION

An object of the present invention is to provide a CD containing case which can perform ornament and/or fragrance in addition to distinction between one's own product and other's product and ornamental effect by means of a photograph, a picture, characters on a jacket.

In order to achieve, the above object, a CD containing case in accordance with the present invention comprises: a main body having a hinge portion; a lid body having a pair of hinge arm portions which are coupled to the hinge portion of the main body; and a plurality of filling members for use of ornament and/or fragrance disposed in a space defined by the hinge portion of the main body and the hinge arm portions of the lid body. According to the CD containing case of the present invention, a space defined in the hinge portion between the main body and the lid body can be utilized as a space for performing an ornamental effect and/or a fragrant effect, thereby presenting additional functions of distinction between one's own product and other's product, ornament, and fragrance to the CD contained in the case, although a conventional CD containing case has utilized such space as a part of a hinge mechanism.

In the CD containing case according to the present invention, the filling members are disposed in a case portion including an inner ramp wall of an inner plate of said main body, a bottom wall extending outwardly from a lower end of the inner ramp wall in parallel with a CD mounting wall, an outer ramp wall extending upwardly from an outer end of the bottom wall in parallel with the inner ramp wall, a pair of side walls interconnecting respective side ends of the inner and outer ramp walls and the bottom wall, a lid wall detachably provided on an opening defined by the inner and outer ramp walls and the pair of side walls. According to this structure, it is possible to maintain the filling members in the given interior of the hinge portion even if the filling members are small in size and to carry out exchange and repair of the filling members, if desired.

Moreover, in the CD containing case of the present invention, it is a case for containing a CD on each of opposite surfaces of an inner plate of the main body, respectively. The filling members are disposed in a case portion including a ramp wall of the inner plate of the main body, a top wall, a bottom wall extending outwardly from a CD mounting wall in parallel with the top wall, and a pair of side walls interconnecting respective side ends of the ramp wall, the top wall, and the bottom wall. According to this structure, the filling members can be maintained in the interior of the hinge portion and can be prevented from coming out of the interior, even if the filling members are small in size.

Further, in the CD containing case of the present invention, the filling members are disposed in an ornamental case having dimensions of contour and a configuration which correspond to an interior of the hinge portion of the main body so that the ornamental case is detachably or fixedly arranged in the interior. According to this structure, it is possible to add the distinction, ornament, fragrance to the CD containing case even if the case is conventional and it is also possible to dispose the filling members in the interior of the hinge portion even if they are small in size, thereby avoiding an accidental breakage of the CD, the jacket, or the like due to falling-out filling members. The ornamental case may have a detachable lid. This enables the filling members to be exchanged or repaired, if necessary.

In addition, in the case where the CD containing case of the present invention uses the filling members including at least a fragrant material, the hinge arm portions of the lid body are pivotably connected to the hinge portion of the main body by a hinge pin provided on each of the hinge arm portions and a cylindrical protrusion or recess formed on or in each of side walls of the hinge portion of the main body so that the protrusion or recess receives the hinge pin. A lid wall or a top wall of the case portion may have at least an aperture for fragrance. The aperture may be closed by a detachable seal. An interior of the ornamental case may be hermetically closed by a material adapted to be pierced by a piercing tool such as a needle or the like. According to this structure of the CD containing case of the present invention, it is possible to maintain the interior of the case portion in a hermetical state and to pierce the ornamental case by the piercing tool such as a needle or the like, if necessary, thereby emitting fragrance from the filling members. This presents excessive emission of fragrance from the filling members 9 and also prevents mixing of different fragrances.

Still further, in the CD containing case of the present invention, the case portion may be provided in the interior with at least a pair of grooves opposed traversally. A partition may be detachably fitted in the groove so that the partition divides the case portion in a longitudinal direction. Alternately, the ornamental case may have at least a partition which extends transversally so as to divide an interior in a longitudinal direction. According to this structure, it is possible to divide the filling members into, for example, an ornamental material and a fragrant material to dispose each material in each of the divided interiors thereby avoiding the mixing of different fragrant materials. Accordingly, various kinds of filling members can be utilized.

Also, in the CD containing case of the present invention, the filling members may be selected in compliance with a kind of CD to be contained in the case. This structure can perform effects except the ornamental effect or the fragrant effect. For example, the filling members made of a herb such as a potpourri, a lavender, or the like may be used in the CD containing case for a CD on which a music for aroma therapy is recorded, thereby enhancing a medical effect, while the filling members made of a material which generates sounds beads, bead balls, colored chips, metal pieces, or the like may be used in the case for a usual music CD so that the case can be used as a musical instrument.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE PREFERRED EMBODIMENTS

Referring now to the drawings, embodiments of a CD containing case in accordance with the present invention will be described below.

First Embodiment

Figure 1:
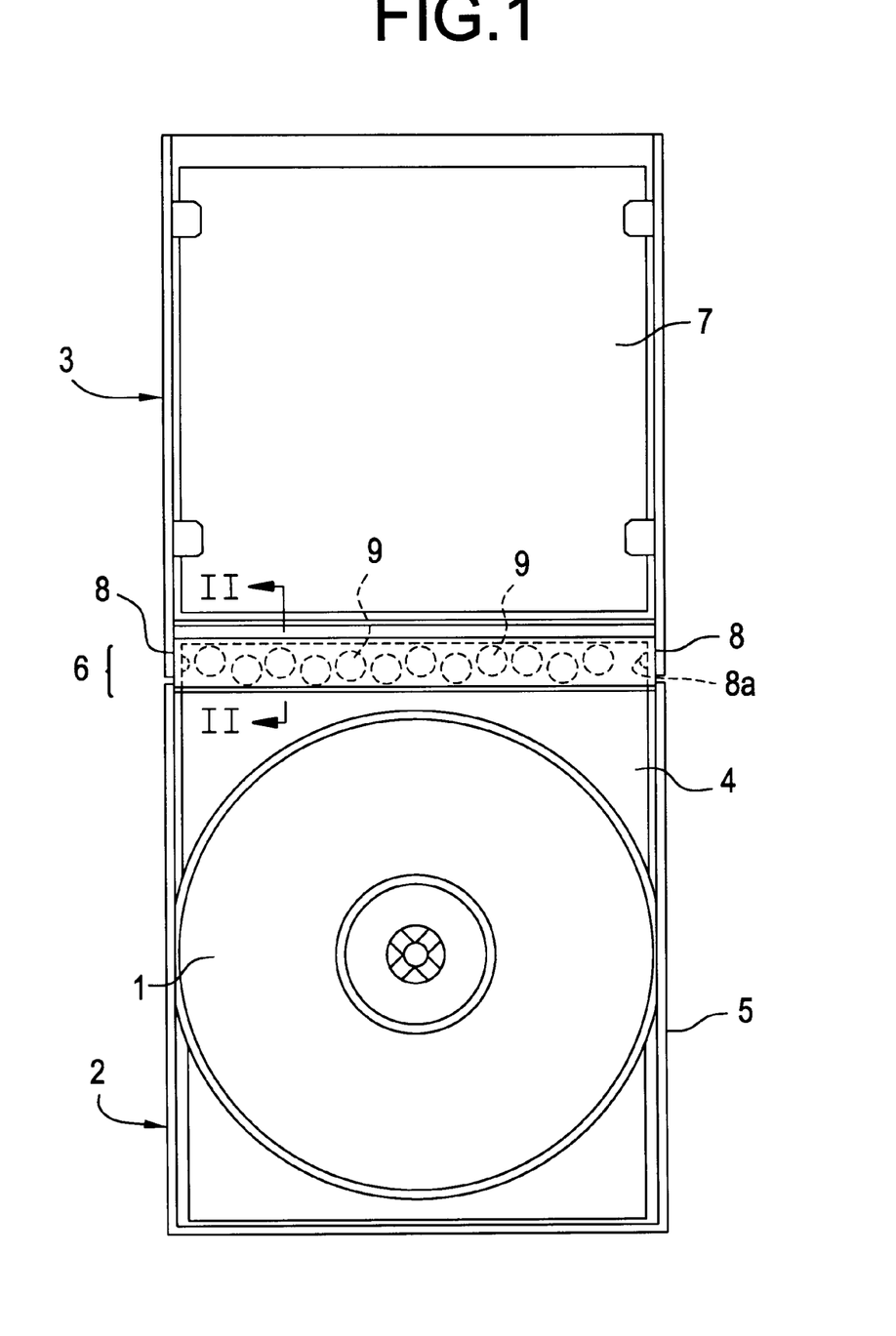
FIG. 1 is a plan view of a first embodiment of a CD containing case in accordance with the present invention, illustrating a lid body in an open position.

A first embodiment of a CD containing case of the present invention, as shown in FIG. 1, has a clear case structure including a main body 2 on which a CD 1 is mounted, and a lid body 3 which is rotatably connected to the main body 2 to cover the CD 1. The case structure is well known and standardized.

Figure 2:
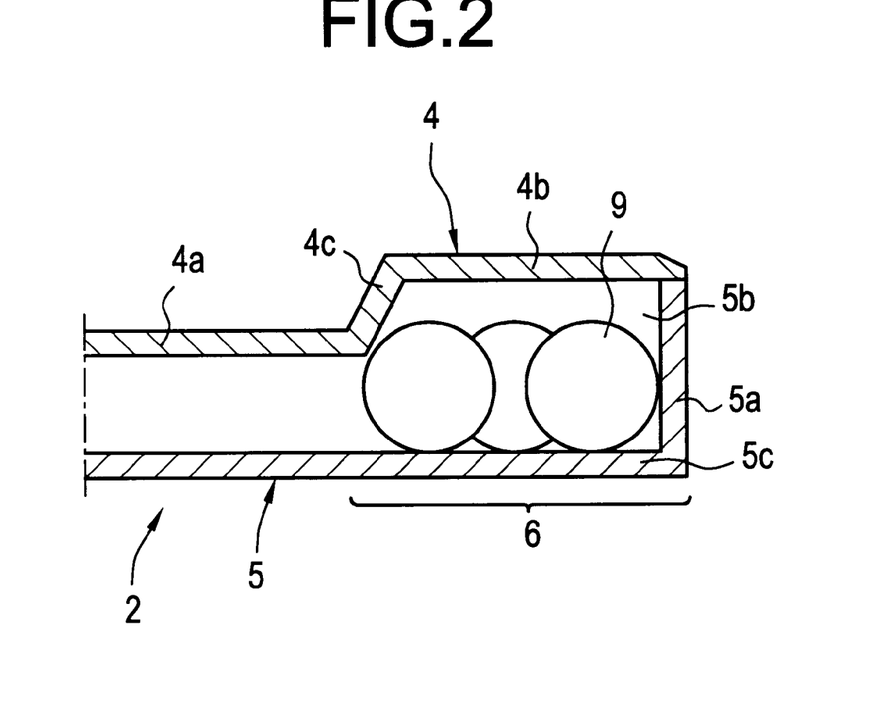
FIG. 2 is an enlarged fragmentary cross sectional view of the case taken along line II—II in FIG. 1.

As shown in FIG. 2, the main body 2 includes an inner plate 4 on which the CD 1 is mounted, and an outer plate 5 connected to the inner plate 4. The inner and outer plates 4 and 5 are separated apart from each other by means of a reinforcement rib (not shown) or the like, so that they define a usual space. The main body 2 is provided on an end thereof with a hinge portion 6 for rotatably coupling the lid body 3 thereto by a means described below. The hinge portion 6 is defined by a top wall 4b which is higher than a CD mounting wall 4a of the inner plate 4, a ramp wall 4c between the walls 4a and 4b, an end wall 5a of the outer plate 5, a pair of side walls 5b, 5b of the outer plate 5 which are disposed on opposite side ends of the top wall 4b and ramp wall 4c of the inner plate 4, a bottom wall 5c of the outer plate 5 below the walls 4a, 4c, and 4b.

The lid body 3 includes a square covering portion 7 adapted to cover the CD 1 on the main body 2, and a pair of hinge arm portions 8, 8 which extends from an end of the portion 7 in parallel with each other. Each of the pair of hinge arm portions 8, 8 is provided on the inner side with a hinge pin 8a which extends inwardly to oppose the other hinge pin 8a on the other portion 8. Each hinge pin 8a is rotatably received in an aperture (not shown) in each side wall 5b of the main body 2.

Filling members 9 for ornament and/or fragrance is disposed in an interior of the hinge portion 6 of the main body 2 of the CD containing case. The filling members 9 are made of a material which can be contained in the interior of the hinge portion 6 and can enhance ornament and/or fragrance for the CD containing case. For example, a filling material for ornament may be beads, bead balls, colored chips, metal pieces, spiral or linear wires, or the like, while a filling material for fragrance may be a herb such as a potpourri, a lavender, or the like, a perfume, a fragrant stone, or the like. The filling members 9 can be disposed in the interior of the hinge portion 6 by the steps of separating the inner and outer plates 4 and 5 from each other, putting the filling members 9 on the outer plate 5 at a position corresponding to the hinge portion 6, and coupling the inner and outer plates 4 and 5 to each other.

According to the CD containing case of the present invention, a space defined in the hinge portion 6 between the main body 2 and the lid body 3 can be utilized as a space for performing an ornamental effect and/or a fragrant effect, thereby presenting additional functions of distinction between one's own product and other's product, ornament, and fragrance to the CD contained in the case, although a conventional CD containing case has merely utilized such space as a part of a hinge mechanism. Preferably, the filling members 9 are selected so as to have a suitable relationship between the members 9 and the CD 1 to be contained in the case. For example, the filling members 9 made of a herb such as a potpourri, a lavender, or the like may be used in the CD containing case for a CD on which a music for aroma therapy is recorded, thereby enhancing a medical effect, while the filling members 9 such as beads, bead balls, colored chips, metal pieces, or the like may be used in the case for a usual music CD so that the case can generate the sound of maracas when shaking the case, thereby increasing a pleasure of music.

Second Embodiment

Figure 3:
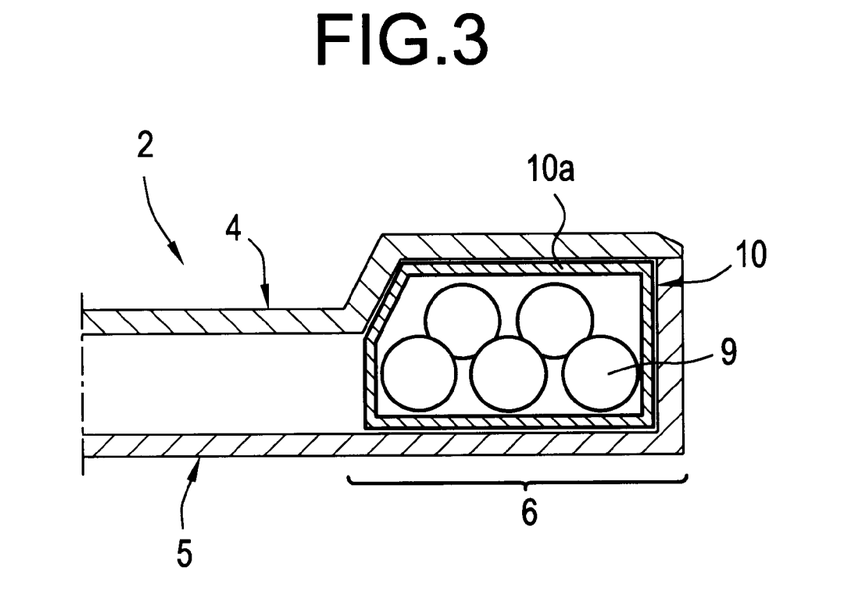
FIG. 3 is an enlarged fragmentary cross sectional view similar to FIG. 2, illustrating a second embodiment of a CD containing case in accordance with the present invention.

FIG. 3 shows a third embodiment of a CD containing case in accordance with the present invention. The second embodiment is the same as the first embodiment except that the filling members 9 are disposed in an ornamental case 10.

The ornamental case 10 has a configuration corresponding to the interior of the hinge portion 6 so that the ornamental case 10 can be detachably or fixedly held in the interior of the hinge portion 6. Preferably, the ornamental case 10 may be sealed in the interior so that, if the filling members 9 are made of very small materials such as star sands (coral powder) or the like, the filling members 9 do not move from the interior of the hinge portion 6 to a space between the inner and outer plates 4 and 5 of the main body 2, the members 9 do not come out of the cases through any clearances between the plates, or the members 9 do not injure the CD case. In this case, at least a top wall 10a of the ornamental case 10 may be made of a transparent material so that the filling members 9 in the case 10 can be seen. Although the ornamental case 10 illustrated in FIG. 3 has the configuration which closely accords with the interior of the hinge portion 6, the case 10 is not limited to the illustrated configuration. The case 10 may be formed into any configuration adapted to be held in the interior of the hinge portion 6, such as a rectangular parallelpiped shape, a cylindrical shape, a bag-like shape, or the like.

In the case where the filling members 9 are made of a fragrant material such as a herb, a perfume, a fragrant stone, or the like, the ornamental case 10 is made of a material which can be pierced by a piercing tool (not shown) such as a needle or the like so that fragrance passes through the pierced apertures, if desired. This prevents excessive emission of fragrance from the filling members 9 and also prevents mixing of different fragrances.

Third Embodiment

Figure 4:
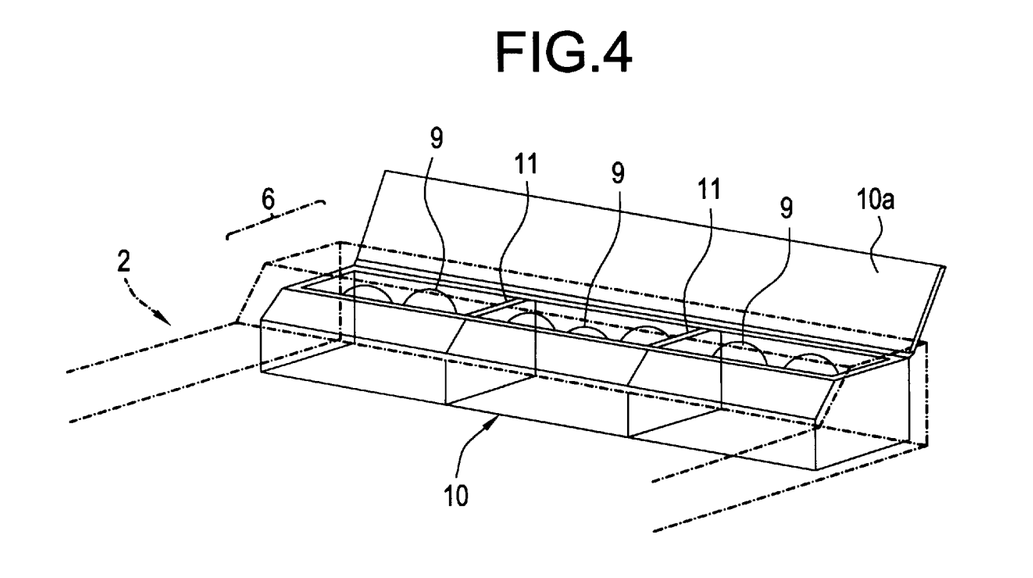
FIG. 4 is a perspective view of an ornamental case to be used in a third embodiment of a CD containing case in accordance with the present invention.

FIG. 4 shows a third embodiment of a CD containing case in accordance with the present invention. The third embodiment is the same as the second embodiment except that the ornamental case 10 is provided with at least one partition 11 (two partitions in the illustrated embodiment) for dividing the interior of the case 10 into small compartments and that the top wall 10a of the case 10 serves as a pivotable lid. Different kinds of fitting members 9 are disposed in the respective compartments of the divided interior by the partitions 11, 11, thereby enhancing ornament and/or fragrance. It is possible to exchange the filling members 9 for new desired ones and to present any ornament and/or fragrance to the CD containing case in accordance with user's tastes, since the top wall 10a can be opened. Any part of the ornamental case 10 except the top wall 10a may be changed to a lid. The ornamental case 10 may be formed by folding a plate in development. It will be easily understood by a person skilled in the art that the top wall 10a as a lid and the partition 11 may be used independently from each other.

Fourth Embodiment

Figure 5:
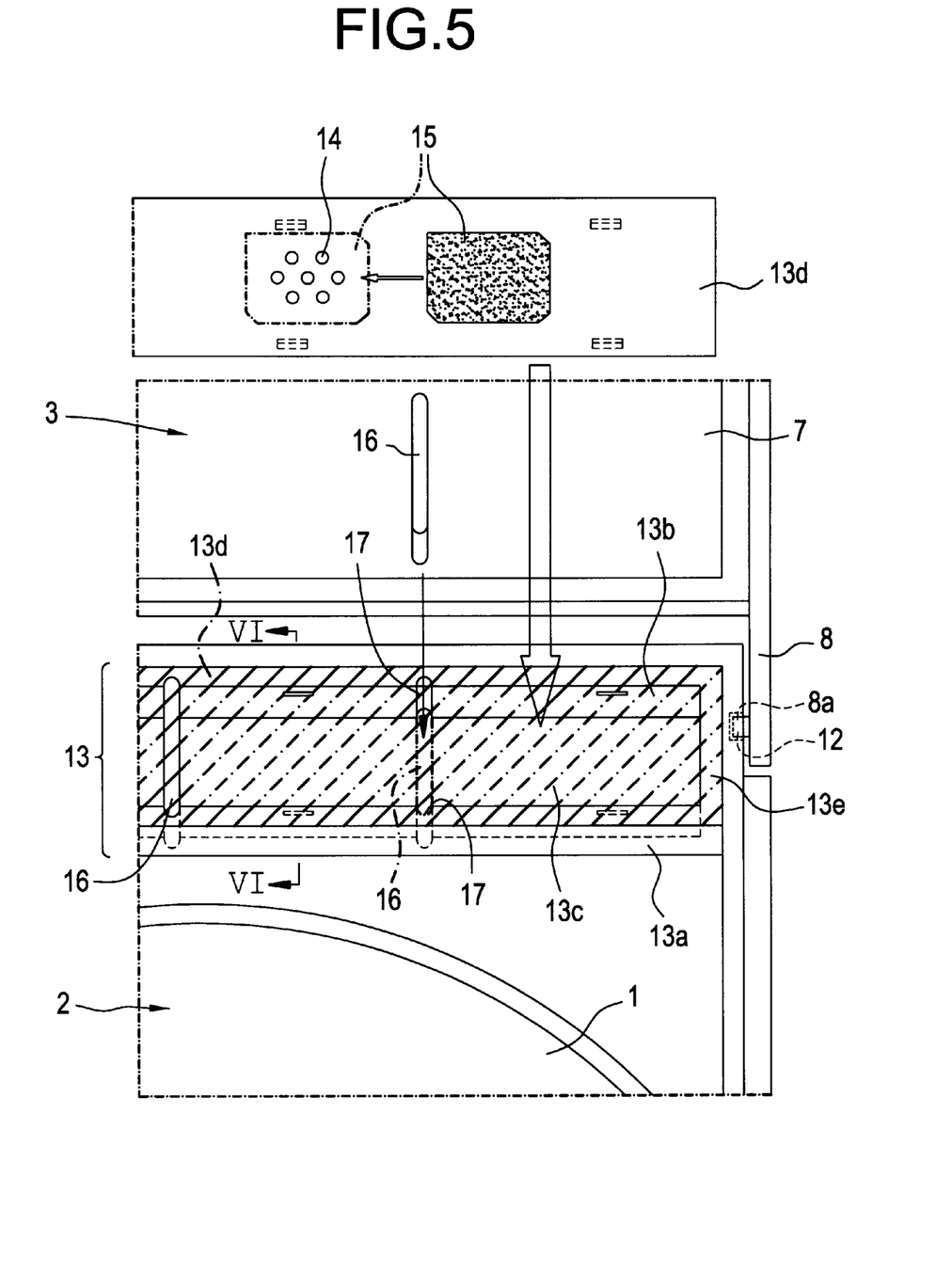
FIG. 5 is a fragmentary plan view of a fourth embodiment of a CD containing case in accordance with the present invention.
Figure 6:
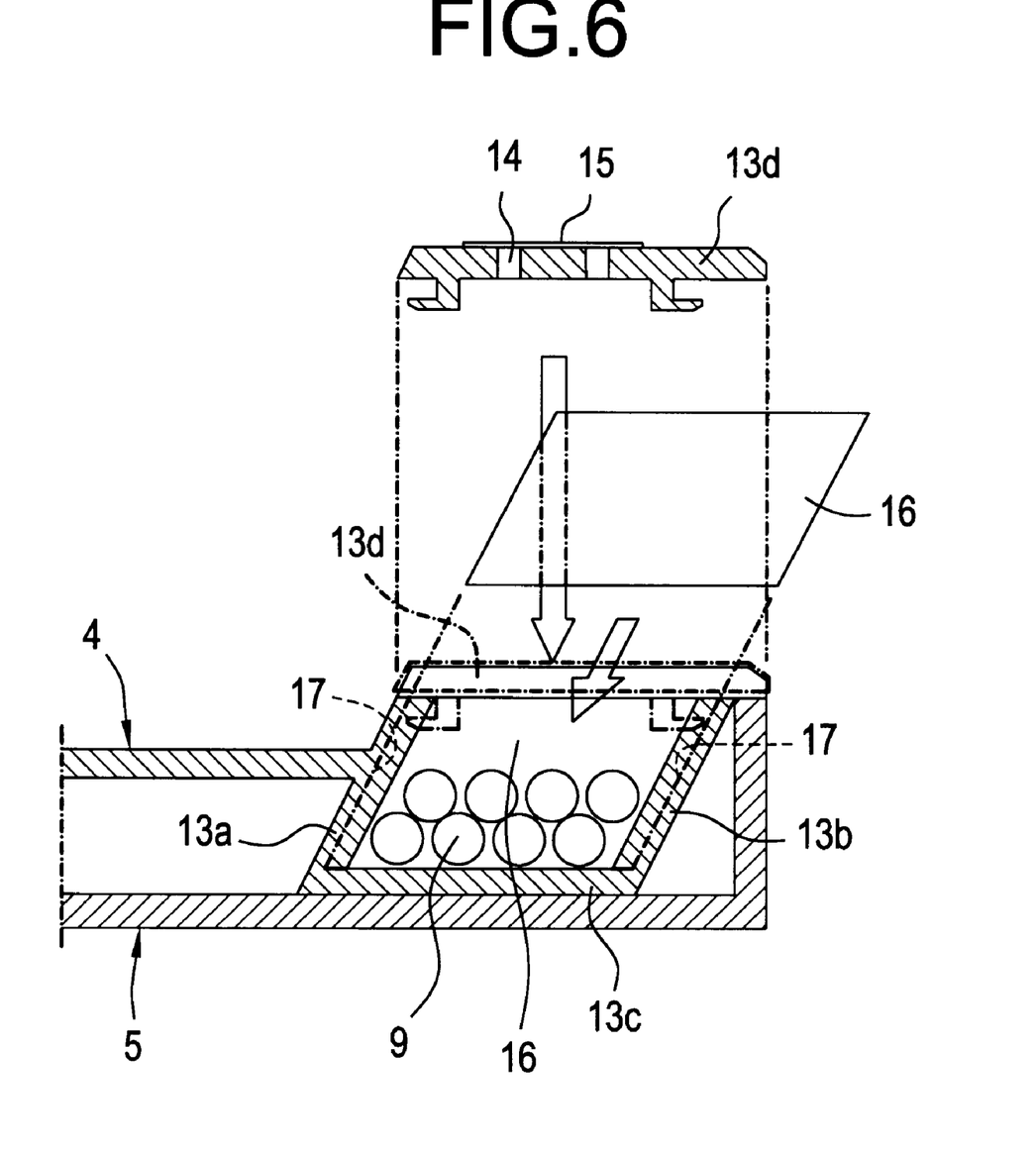
FIG. 6 is an enlarged fragmentary cross sectional view of the case taken along line VI—VI in FIG. 5.

FIGS. 5 and 6 show a fourth embodiment of a CD containing case in accordance with the present invention. In the fourth embodiment, the ornamental case 10 in the third embodiment is formed together with the CD containing case.

In this embodiment, the lid body 3 may be coupled to the main body 2 by rotatably inserting the hinge pins 8a on the hinge arm portions 8 of the lid body 3 into the apertures in the side walls 5b of the main body 2 by the same manner as the conventional CD case.

Preferably, the hinge pins 8a may be pivotably fitted in cylindrical protrusions or recesses (recesses in the illustrated case) 12 on the account of the reason described after.

The inner plate 4 is provided on a part corresponding to the hinge portion 6 with a case portion 13. The case portion 13 includes an inner ramp wall 13a which extends from the inner ramp wall 4c of the inner plate 4 to a position adjacent to the bottom wall 5c of the outer plate 5, an outer ramp wall 13b which extends downward from a position adjacent to the end wall 5a of the outer plate 5 to a position adjacent to the bottom wall 5c of the outer plate 5 in parallel with the inner ramp wall 13a, a bottom wall 13c which interconnects distal ends of the inner and outer ramp walls 13a and 13b, a lid wall 13d which interconnects proximal ends of the inner and outer ramp walls 13a and 13b (corresponding to the top wall 4b), and a pair of side walls 13e, 13e which form opposite side walls of the case portion 13.

The lid wall 13d is detachably connected to the respective ends of the walls 13a, 13b, 13e, 13e to seal the interior of the case portion 13. The lid wall 13d is provided with at least an aperture 14 for fragrance which is normally closed by a removable seal 15. The inner and outer ramp walls 13a and 13b are provided in each of inner surfaces with a pair of grooves 17, 17 which are opposed transversally to receive a partition 16. In the case where a plurality pairs of grooves 17, 17 are provided, they are spaced by given distances in a longitudinal direction of the case portion 13. The filling members 9 for ornament and/or fragrance are disposed in the interior of the case portion 13 by the same manner as the embodiments described above.

The CD containing case in the fourth embodiment is constructed by combining the inner and outer plates to form the main body 2 by the same manner as the conventional CD containing case, and by inserting the hinge pins 7a, 7a on the hinge arm portions 7, 7 of the lid body 3 into the protrusions or recesses on the side walls 5b, 5b of the main body 2. Then, the partition 16 may be fitted in the grooves 17, if necessary. Thereafter, the desired filling members 9 are disposed in the case portion 13 and the lid wall 13d is mounted on the case portion 13 to complete the CD containing case. The aperture 14 for fragrance in the lid wall 13d may be closed by a seal 15 in order to prevent excessive emission of fragrance or to prevent mixing of different fragrances in the case where the filling members 9 are made of a fragrant material. In other words, it is not necessary to provide the aperture 14 for fragrance and the seal, if the filling members 9 are made of only a material for ornament.

It will be preferable to select the filling members 9 being disposed in the case portion 13 in accordance with a kind of CD being contained in the CD containing case by the same manner as the embodiments described above. It is also possible to present a medical effect or a musical instrument effect as well as the ornamental or fragrant effect, as described above.

Fifth Embodiment

Figure 7:
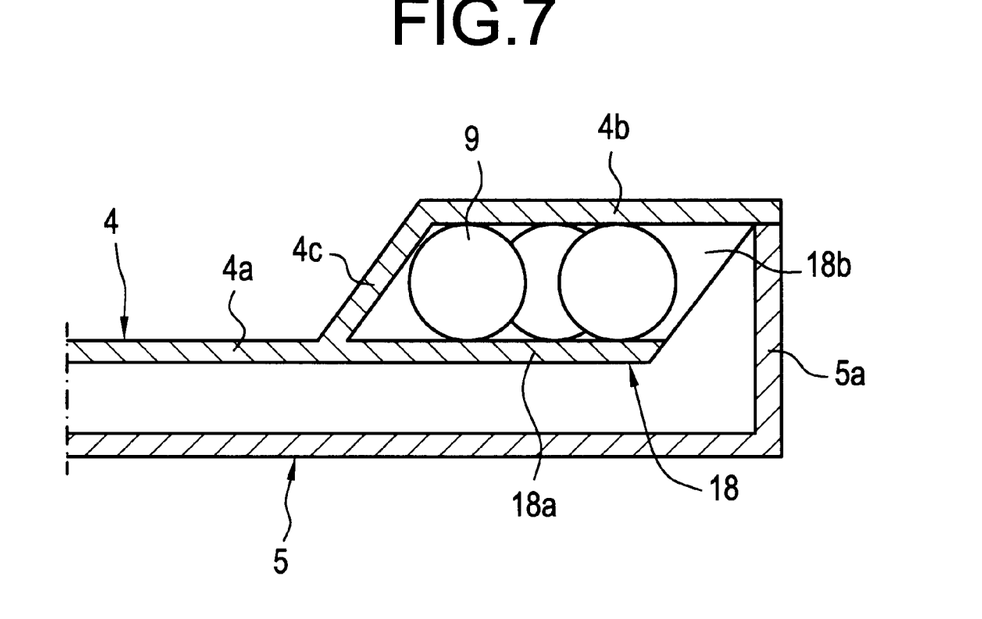
FIG. 7 is an enlarged fragmentary cross sectional view similar to FIG. 6, illustrating a fifth embodiment of a CD containing case in accordance with the present invention.

FIG. 7 shows a fifth embodiment of a CD containing case in accordance with the present invention. The CD containing case in this embodiment is so called a two-set case or a three-set case in which each CD is mounted on at least opposite sides of the inner plate 4 of the main body 2. Such a case is different from a usual case for a single CD in the respect that the inner plate 4 is detachably coupled to the outer plate 5 by a simple engaging means so that a CD on the rear side of the inner plate 4 can be readily taken out of the case.

In this embodiment, the filling members 9 are disposed in a case portion 18 including a ramp wall 4c and a top wall 4b of the inner plate 4 of the main body 2, a bottom wall 18a which extends outwardly from the CD mounting wall 4a in parallel with the top wall 4b (in a direction toward the end wall 5a in FIG. 2), and a pair of side walls which interconnect the respective ends of the walls 4c, 4b and 18a.

Since there is a possibility in which the filling members 9 may come out of the case portion 18 when the inner plate 4 is opened and closed, in this embodiment, it is preferable to select the filling members adapted to be fixed in the case portion 18. However, this embodiment has an advantage that the filling members can be readily exchanged, since the inner and outer plates 4 and 5 are detachably interconnected.

Figure 8:
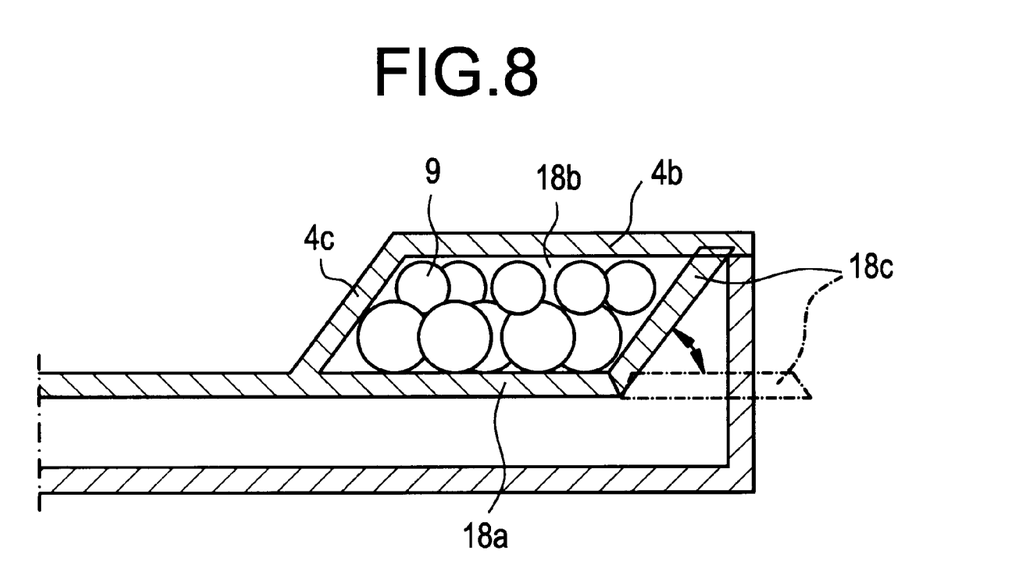
FIG. 8 is an enlarged fragmentary cross sectional view similar to FIG. 7, illustrating an alteration of the fifth embodiment of a CD containing case in accordance with the present invention.

In order to prevent the filling members 9 from coming out of the case portion 18, as shown in FIG. 8, a pivotable lid wall 18c may be provided on the opening defined by the top wall 4b, bottom wall 18a, and opposite side walls 18b, 18b (alteration of the fifth embodiment). The lid wall 18c may be attached to the opening by means of fitting engagement by the manner as the lid wall 13d shown in FIG. 6 as well as hinging engagement. These fifth embodiment and its alteration may have a detachable partition 11, a pivotable connection between the main body 2 and the lid body 3 by means of hinge pins 8a and cylindrical protrusions or recesses 12, an aperture 14 for fragrance, or a removal seal 15 for closing the aperture, by the same manner as the fourth embodiment described above.

Further, it is also preferable to select the filling members 9 being disposed in the case portion 18 on the basis of a kind of CD 1 being accommodated in the CD containing case and it is possible to add the medical effect or the musical instrument effect to the CD containing case by the same manner as the case portion 13.

According to the present invention, a space defined in the hinge portion 6 between the main body 2 and the lid body 3 can be utilized as a space for performing an ornamental effect and/or a fragrant effect by charging the filling members 9 in the space thereby presenting additional functions of distinction between one's own product, and other's product, ornament, and fragrance to the CD contained in the case, although a conventional CD containing case has utilized such space as a part of a hinge mechanism.

It is also possible to prevent the filling members 9 from falling out of a given place, even if the filling members are small in size, by disposing the ornamental case 10 in the interior of the hinge portion 6 or by disposing the filling members 9 in the case portion 13 or 18 which is defined in the hinge portion 6. Moreover, it is possible to prevent mixing of different fragrances and to utilize various kinds of filling member by providing the partition in the ornamental case 10 or the case portion 13 or 18 and/or by providing the detachable lid on the case or portion, and then by dividing the filling members into an ornamental material and a fragrant material so as to charge each material in each space divided by the partition in the case or portion.

In addition, by hermetically closing the interior of the ornamental case 10 or the case portion 13 or 18, and then by opening the interior if desired, it is possible to prevent excessive emission of fragrance and mixing of different fragrances and it is also to prevent a medical effect, a pleasure of joining to a musical performance as well as ornament and fragrance to the CD containing case by selecting the filling members in compliance with a kind of CD being contained in the case.

When a so called set-CD containing case is used, since the case portion 18 can be easily exposed, it is possible to conveniently carry out exchange or repair of the filling members 9 to be contained in the case portion 18.

From the above description of the invention, those skilled in the art will perceive improvements, changes and modifications. Such improvements, changes and modifications within the skill of the art are intended to be covered by the appended claims.

The entire disclosure of Japanese Utility Model Application Nos. HEI 10-144 (1998) and HEI 10-1644 (1998) filed on Jan. 7, 1998 and Mar. 6, 1998 respectively, including specification, claims, drawings and summary is incorporated herein by reference in its entirety.

What is claimed is:

1. A CD containing case comprising:

a main body having a hinge portion;

a lid body having a pair of hinge arm portions which are coupled to said hinge portion of said main body;

a plurality of filling members disposed in a case portion defined by said hinge portion of said main body and said hinge arm portions of said lid body;

said case portion including an inner ramp wall of an inner plate of said main body, a bottom wall extending outwardly from a lower end of said inner ramp wall in a parallel position with a CD mounting wall, an outer ramp wall extending upwardly from an outer end of said bottom wall in a parallel position with said inner ramp wall, a pair of side walls interconnecting respective side ends of said inner and outer ramp walls and said bottom wall; and a lid wall detachably provided on an opening defined by said inner and outer ramp walls and said pair of side walls;

whereby in a first case said filling members are used to provide an ornamental display, in a second case said filling members are used to provide a fragrance, and in a third case said filling members are used to provide both an ornamental display and a fragrance.

2. A CD containing case according to claim 1, wherein said filling members include at least a fragrant material, wherein said hinge arm portions of said lid body are pivotably connected to said hinge portion of said main body by a hinge pin provided on each of said hinge arm portions and a cylindrical protrusion or recess formed on or in each of side walls of said hinge portion of said main body so that said protrusion or recess receives said hinge pin, wherein said lid wall or a top wall of said case portion has at least an aperture for fragrance, and wherein said aperture is closed by a detachable seal.

3. A CD containing case according to claim 1, wherein said case portion is provided in an interior portion with at least a pair of grooves opposed traversally, and wherein a partition is detachably fitted in said groove so that said partition divides said case portion in a longitudinal direction.

4. A CD containing case according to claim 2, wherein said case portion is provided in an interior portion with at least a pair of grooves opposed traversally, and wherein a partition is detachably fitted in said groove so that said partition divides said case portion in a longitudinal direction.

5. A CD containing case according to claim 1, wherein said CD containing case contains a specific type of CD, said filling members being selected to coact with said specific type of CD contained in said case.

6. A CD containing case according to claim 2, wherein said CD containing case contains a specific type of CD, said filling members being selected to coact with said specific type of CD contained in said case.

7. A CD containing case according to claim 3, wherein said CD containing case contains a specific type of CD, said filling members being selected to coact with said specific type of CD contained in said case.

8. A CD containing case according to claim 4, wherein said CD containing case contains a specific type of CD, said filling members being selected to coact with said specific type of CD contained in said case.

* * * * *